US008841479B2

(12) United States Patent
Spyrou et al.

(10) Patent No.: US 8,841,479 B2
(45) Date of Patent: Sep. 23, 2014

(54) LOW MONOMER 1 : 1 MONOADDUCTS OF REACTIVE OLEFINIC COMPOUNDS AND DIISOCYANATES USING INSERTABLE INHIBITORS

(75) Inventors: Emmanouil Spyrou, Schermbeck (DE); Stephan Kohlstruk, Duelmen (DE); Elke Gollan, Herne (DE); Andrea Henschke, Duelmen (DE); Nicole Fresmann, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 428 days.

(21) Appl. No.: 13/132,124

(22) PCT Filed: Oct. 22, 2009

(86) PCT No.: PCT/EP2009/063851
§ 371 (c)(1),
(2), (4) Date: Jun. 1, 2011

(87) PCT Pub. No.: WO2010/072439
PCT Pub. Date: Jul. 1, 2010

(65) Prior Publication Data
US 2011/0251424 A1 Oct. 13, 2011

(30) Foreign Application Priority Data

Dec. 22, 2008 (DE) .......................... 10 2008 055 078
Aug. 25, 2009 (DE) .......................... 10 2009 028 862

(51) Int. Cl.
*C07C 249/00* (2006.01)
*C08G 18/81* (2006.01)

(52) U.S. Cl.
CPC ........ *C08G 18/8108* (2013.01); *C08G 18/8175* (2013.01); *C08G 18/8166* (2013.01)
USPC ............................ 560/336; 560/330; 560/355

(58) Field of Classification Search
CPC ....................................................... C07C 265/00
USPC ......................................... 560/330, 336, 355
See application file for complete search history.

(56) References Cited

U.S. PATENT DOCUMENTS

| 5,847,021 A | 12/1998 | Tortorello et al. |
| 6,107,361 A | 8/2000 | Tortorello et al. |
| 6,548,696 B2 * | 4/2003 | Kohlstruk et al. ............ 560/224 |
| 2001/0005738 A1 | 6/2001 | Bruchmann et al. |
| 2002/0049349 A1 | 4/2002 | Kohlstruk et al. |

FOREIGN PATENT DOCUMENTS

| DE | 43 05 422 | 8/1993 |
| EP | 1 110 946 | 6/2001 |
| EP | 1 179 555 | 2/2002 |

OTHER PUBLICATIONS

Antonucci, J. M. et al., "Isocyanato Urethane Methacrylates Derived From Hydroxyethyl Methacrylate", J. Dent. Res., vol. 59, No. 1, pp. 35-43, XP-002562607, (Jan. 1980).
Lee, W. et al., "Synthesis and Characterization of Novel Sulfobetaines Derived From 2,4-Tolylene Diisocyanate", Journal of Applied Polymer Science, vol. 82, pp. 3447-3459, XP-002562584, (2001).
International Search Report Issued Feb. 12, 2010 in PCT/EP09/063851 filed Oct. 22, 2009.

* cited by examiner

*Primary Examiner* — Sudhakar Katakam
(74) *Attorney, Agent, or Firm* — Oblon, Spivak, McClelland, Maier & Neustadt, L.L.P.

(57) ABSTRACT

The invention relates to low monomer 1:1 monoadducts of reactive olefinic compounds and diisocyanates, to the production and to the use thereof.

20 Claims, No Drawings

LOW MONOMER 1 : 1 MONOADDUCTS OF REACTIVE OLEFINIC COMPOUNDS AND DIISOCYANATES USING INSERTABLE INHIBITORS

CROSS REFERENCE TO RELATED APPLICATION

This application is a National Stage entry under 35 USC 371 of PCT/EP2009/063851filed on Oct. 22, 2009, and claimed priority to Germany patent application No. 10 2009 028 826.7, filed on Aug. 25 2009, and Germany patent application No. 10 2008 055 078.7, filed on Dec. 22, 2008.

This invention relates to low-monomer-content 1:1 monoadducts of reactive olefinic compounds and diisocyanates, the preparation, and the use.

The monoadducts of reactive olefinic compounds and diisocyanates, on account of their inherent hetero-functionality, are valuable synthesis building blocks with a diversity of possible uses. Fields of application lie, for example, in the area of the preparation of acrylic-functionalized derivatives containing urethane groups, by reaction of the isocyanate group with monofunctional reagents, or the preparation of corresponding acrylic-functionalized, UV-curable resins, by reaction of the isocynate group with polyfunctional reactants. Also possible is the preparation of polyisocyanates by, for example, free-radically initiated homo- or copolymerization of the (meth)acrylic group. The readiness of the NCO groups in such polymers to react enables easy access under mild conditions to tailor-made polymers with a unique profile of properties.

The use of isocyanates with olefinic double bonds has already often been described in the patent literature—for example, for the production of crosslinkers (DE 35 01 493) and self-crosslinking systems (U.S. Pat. No. 4,861,853), including water-based systems (EP 0 519 513).

Adducts of diisocyanates and reactive olefinic compounds are conventionally obtained by reaction of the reactants in a molar ratio of 1:1 (NCO/OH=2:1). The product of this process is inevitably a mixture of heterofunctional monoadduct, bisadduct (1:2 adduct), and residual monomer, in a ratio of approximately 1:1:1. By using an excess of diisocyanate it is possible to restrain the bisadduct content of the mixture. This comes at the expense of an increase in the fraction of residual monomer. When an excess of hydroxyalkyl (meth)acrylate is used, the opposite effect comes about. As diacrylates, in contrast to the corresponding monoadduct, the bisadducts no longer meet the desired criterion of heterofunctionality. They lessen the quality of the monoadduct and also remain not without effect on the quality and the pattern of properties of the target end products. The same considerations also apply to the excess starting diisocyanate that remains in the adduct. Diisocyanates, moreover, are very reactive compounds. For this reason, representatives of this class of substance are classified as toxic and must be labeled accordingly under chemicals law. In principle, therefore, a high residual monomeric diisocyanate content should be avoided in the product.

The distillative removal of the residual monomer content is considered generally to be difficult, since the temperature load on the mixture causes an unwanted polymerization (gelling) of the reactive olefinic double bonds.

EP 1 179 555 describes the preparation of low-monomer content adducts of this kind from hydroxyalkyl (meth)acrylate and diisocyanates, by removal of the monomeric diisocyanate by means of a short-path distillation using specific catalyst mixtures and conditions. This is indeed technically possible, but functions only if the experimental conditions are observed very precisely. With even slight deviations in distillation temperature, pressure, inhibitor gas flow rate, NCO/OH ratio or wall material, the risk exists that the product will polymerize within the short-path distillation column and hence become unusable, and, in addition, necessitate considerable cost and complexity for cleaning.

The object, therefore, was to find new 1:1 monoadducts and a process for preparing them that does not entail the disadvantages known to date in the prior art, such as, for example, the susceptibility to gelling, both in the distillation column and in the residue itself, and, in particular, which provides access to low-monomer-content adducts of reactive olefinic compounds and diisocyanates with a significantly reduced susceptibility to error.

Surprisingly it has been found that new low-monomer-content 1:1 monoadducts of reactive olefinic compounds and diisocyanates can be prepared with particular ease and reliability by distillation when incorporable polymerization inhibitors are present.

The invention provides low-monomer-content 1:1 monoadducts having a free diisocyanate content of less than 5% by weight, preferably less than 1.0% by weight, obtained from, as starting compounds, A) at least one aliphatic, cycloaliphatic and/or araliphatic diisocyanate in an amount of 1-20 mol, and B) 1 mol of at least one reactive olefinic compound having an OH group, the unreacted diisocyanate being separated off by short-path distillation from the reaction product, characterized in that the short-path distillation takes place in the presence C) of at least one inhibitor which possesses at least one functional group reactive toward NCO groups, the amount of the inhibitor being between 0.1% -3% by weight, based on the weight of the sum of one mole of diisocyanate A) and one mole of a reactive olefinic compound B) (corresponding to an NCO/OH of 2:1), it being possible for the inhibitor to be added before or after the reaction of A) with B), and the inhibitor 1. being present in free form, and/or
2. being attached to the component A) and/or
3. being attached to the reaction product of A) with B), and where, during the distillation process or the entire process, at least one inhibitor gas is passed through the apparatus.

The invention also provides a process for preparing low-monomer-content 1:1 monoadducts having a free diisocyanate content of less than 5% by weight, preferably less than 1.0% by weight, from, as starting compounds, A) at least one aliphatic, cycloaliphatic and/or araliphatic diisocyanate in an amount of 1-20 mol, and B) 1 mol of at least one reactive olefinic compound having at least one OH group, obtained by reaction in a temperature range of 40-120° C., the unreacted diisocyanate being separated off subsequently by a short-path distillation at 80-220° C./0.1-10 mbar from the reaction product, characterized in that the short-path distillation takes place in the presence C) of at least one inhibitor which possesses at least one functional group reactive toward NCO groups, the amount of the inhibitor being between 0.1% -3% by weight, based on the weight of the sum of one mole of diisocyanate A) and one mole of a reactive olefinic compound B) corresponding to an NCO/OH ratio of 2:1, the inhibitor being added before or during or after the reaction of A) with B), and where during the distillation process or the entire process, at least one inhibitor gas is passed through the apparatus.

The low-monomer-content 1:1 monoadducts of diisocyanates A) and reactive olefinic compounds B), having a free diisocyanate content of less than 5% by weight, preferably less than 1.0% by weight, are obtained in principle by reaction of 1-20, preferably 1-4.9 mol, more preferably 1.5-4 mol, of diisocyanate A) with 1 mol of a reactive olefinic compound B) in a temperature range of 40-120° C., preferably 40-80° C., the reaction being carried out until conversion of the reactive olefinic compound B) is complete, and the unreacted diisocyanate being subsequently separated by a short-path distillation at 80-220° C. and a pressure of 0.1-10 mbar from the reaction product. The specific inhibitors C), which are added either before, during or after the reaction, are notable for the fact that they are chemically reactive toward NCO groups and hence can be incorporated. The use of an inhibitor gas selected from air, nitrogen monoxide, oxygen alone or in mixtures, or mixtures which as well as air, oxygen or nitrogen monoxide include an additional fraction of 1%-90% by volume of carbon dioxide, nitrogen or noble gases, or mixtures of these gases, which are passed as inhibitor gas through the apparatus during the distillation process or the entire process, has proven to be advantageous in this context. It is particularly advantageous in this context to pass the stream of inhibitor gas through all parts of the distillation apparatus that may come into contact with the product.

If the reaction is carried out in a solvent, this solvent is removed before the residual monomer content is separated off. The excess diisocyanate is removed by distillation in short-path evaporators, preferably using thin-film evaporators, or falling-film evaporators. The distillation is carried out at 80-220° C., preferably at 130-200° C., and at a pressure of 0.1-10 mbar, preferably 0.5 to 5 mbar, in the presence of an inhibitor gas. The temperature and the subatmospheric pressure are guided by the viscosity behavior of the products in question and, moreover, are a function of the optimum gas supply rate. The short-path evaporator may be, for example, a glass apparatus or else a metal apparatus. The low-monomer-content 1:1 monoadducts obtained in this way have a monomeric diisocyanate content of <1% by weight, preferably <0.7% by weight, more preferably <0.5%. Of course, here as well there is a slight level of formation of diadducts from diisocyanate and olefinic compound. The lower the excess of diisocyanate and the lower the selectivity, in other words the difference in reactivity among the isocyanate groups, the more pronounced the presence of these diadducts (cf. Farbe and Lack, 2000, Vol. 11, pp. 126-130). The amount of these diadducts in the end product varies between 0.1% and 15% by weight, and is preferably 0.1%-5%, more preferably 0.1%-1%.

The characterization of the low-monomer-content 1:1 monoadducts of the invention takes place via the preparation process—product by process.

It is essential to the invention that the inhibitor C) possesses functional groups which are able to react with the NCO groups of the diisocyanate A), and the functional group of the inhibitor C) is attached to an aliphatic or cycloaliphatic hydrocarbon radical, and not solely to an aromatic hydrocarbon radical, as in the case, for example, of inhibitors as described in EP 1 179 555.

Also essential to the invention is that the inhibitor C) is present during the short-path distillation. The inhibitor C), as described above, may be present in free form. Moreover, the inhibitor—prior to the reaction of A) with B)—may be reacted with the diisocyanate A). It is likewise possible for the inhibitor to be added before or during or after the reaction of A) with B). The result of this is that the inhibitor C) may in principle be added before or during the short-path distillation. For the low-monomer-content 1:1 monoadducts of the invention, this means that the inhibitor C) is present in them
1. partially in free form, and/or
2. attached to the component A) and/or
3. attached to the reaction product of A) with B).

Partially here means that 0.1%-99% by weight of the inhibitor is present in free form.

Suitable isocyanates are aliphatic, cycloaliphatic, and araliphatic—i.e., aryl-substituted aliphatic—diisocyanates, as are described in, for example, Houben-Weyl, Methoden der organischen Chemie, Volume 14/2, pages 61-70 and in the article by W. Siefken in Justus Liebigs Annalen der Chemie 562, 75-136, such as 1,2-ethylene diisocyanate, 1,4-tetramethylene diisocyanate, 1,6-hexamethylene diisocyanate (HDI), 2,2,4-trimethyl-1,6-hexamethylene diisocyanate (TMDI), 2,4,4-trimethyl-1,6-hexamethylene diisocyanate (TMDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3-diisocyanate, cyclohexane 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-(1,4-methano-naphthalen)-2,5-ylenedimethylene diisocyanate, decahydro-8-methyl-(1,4-methano-naphthalen)-3,5-ylenedimethylene diisocyanate, hexahydro-4,7-methanoindan-1,5-ylenedimethylene diisocyanate, hexahydro-4,7-methanoindan-2,5-ylenedimethylene diisocyanate, hexahydro-4,7-methanoindan-1,6-ylenedimethylene diisocyanate, hexahydro-4,7-methanoindan-2,5-ylenedimethylene diisocyanate, hexahydro-4,7-methanoindan-1,5-ylene diisocyanate, hexahydro-4,7-methanoindan-2,5-ylene diisocyanate, hexahydro-4,7-methanoindan-1,6-ylene diisocyanate, hexahydro-4,7-methanoindan-2,6-ylene diisocyanate, 2,4-hexahydrotolylene diisocyanate, 2,6-hexahydrotolylene diisocyanate, 4,4'-methylenedicyclohexyl diisocyanate (4,4'-$H_{12}$MDI), 2,2'-methylenedicyclohexyl diisocyanate (2,2'-$H_{12}$MDI), 2,4-methylenedicyclohexyl diisocyanate (2,4-$H_{12}$MDI) or else mixtures, 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, and any desired mixtures of these compounds.

Further suitable isocyanates are described in the aforementioned article in the Annalen on page 122 f. Also suitable are 2,5-bis(isocyanatomethyl)bicyclo[2.2.1]heptane (NBDI) and/or 2,6-bis(isocyanatomethyl)bicyclo[2.2.1]heptane (NBDI), in each case as the pure substance or as a mixed component. The preparation of these diisocyanates is nowadays carried out generally either by the phosgene route or via the urea process. The products of both methods are equally suitable for use in the process of the invention. With particular preference, generally speaking, the aliphatic and cycloaliphatic diisocyanates that are readily accessible industrially, such as IPDI, HDI, and $H_{12}$MDI, for example, and also their isomer mixtures, are used.

Suitable reactive olefinic compounds are all compounds which carry not only at least one methacrylate or acrylate function or vinyl ether group but also exactly one hydroxyl group. Further constituents may be aliphatic, cycloaliphatic, aromatic or heterocyclic alkyl groups. Oligomers or polymers are also conceivable.

Preference is given to readily accessible products such as, for example, hydroxyethyl acrylate, hydroxypropyl acrylate, hydroxybutyl acrylate, and hydroxyethyl methacrylate, hydroxypropyl methacrylate, hydroxylbutyl methacrylate, glycerol diacrylate, pentaerythritol triacrylate, trimethylolpropane diacrylate, glycerol dimethacrylate, pentaerythritol trimethacrylate, and trimethylolpropane dimethacrylate, and also hydroxylethyl vinyl ether, hydroxypropyl vinyl ether, hydroxylbutyl vinyl ether, hydroxypentyl vinyl ether, and hydroxyhexyl vinyl ether. Particularly preferred is hydroxyethyl acrylate. Mixtures as well can of course be used.

The reaction of polyisocyanates with reactive olefinic compounds entails the reaction of the free NCO groups with hydroxyl groups, and has already been frequently described (EP 0 669 353, EP 0 669 354, DE 30 30 572, EP 0 639 598 or EP 0 803 524). This reaction may take place either with but also without solvent. It is carried out generally in a temperature range between 40 and 80° C. and can be catalyzed advantageously by common catalysts known within urethane chemistry, such as, for example, organometallic compounds, such as dibutyltin dilaurate (DBTL), dibutyltin dineodecanoate, zinc octoate, or bismuth neodecanoate, for example; and also tertiary amines, e.g., triethylamine or diazobicyclooctane, etc. Suitable reaction assemblies include all customary apparatus, tanks, static mixers, extruders, etc., preferably assemblies which possess a mixing or stirring function. The NCO/OH ratio is 2:1 to 40:1, preferably 2:1 to 9.8:1, and more preferably 3:1 to 8:1. This corresponds to a reaction of 1-20 mol, preferably 1-4.9 mol, more preferably 1.5-4 mol of diisocyanate A) with 1 mol of a reactive olefinic compound B).

Incorporable inhibitors C) possess nonaromatic, NCO-reactive functional groups, preferably hydroxyl, thiol or amine groups, which are able to form covalent bonds with isocyanates. Reactive functional groups of this kind that are attached to aromatic groups do also react with NCO groups, but are generally eliminated again under the distillation conditions and are therefore not suitable for incorporation. Suitable compounds, therefore, are all those which are in customary commercial use as polymerization inhibitors (see section below), but in addition still possess nonaromatic, isocyanate-reactive groups, preferably hydroxyl, thiol or amine groups. The reactive functional groups are preferably attached to an aliphatic or cycloaliphatic hydrocarbon radical. Such compounds are described in U.S. Pat. No. 4,260,832 and GB 226 47 08, for example. Those contemplated include, for example, 3,5-di-tert-butyl-4-hydroxybenzyl alcohol, 3-(3,5-di-tert-butyl-4-hydroxyphenyl)propanol, 4-(3,5-di-tert-butyl-4-hydroxyphenyl)butanol, 5-(3,5-di-tert-butyl-4-hydroxyphenyl) pentanol, 6-(3,5-di-tert-butyl-4-hydroxyphenyl)hexanol, 3-tert-butyl-5-methyl-4-hydroxybenzyl alcohol, 3-(3,5-di-tert-butyl-4-hydroxyphenyl)-propanol, 4-(3-tert-butyl-5-methyl-4-hydroxyphenyl)-butanol, 5-(3-tert-butyl-5-methyl-4-hydroxyphenyl)-pentanol, 6-(3-tert-butyl-5-methyl-4-hydroxyphenyl)-hexanol, 3,5-di-tert-butyl-4-hydroxybenzyl alcohol, 3-(3,5-di-tert-butyl-4-hydroxyphenyl)propanol, 4-(3,5-dimethyl-4-hydroxyphenyl)butanol, 5-(3,5-di- dimethyl-4-hydroxyphenyl)pentanol, 6-(3,5-dimethyl-4-hydroxyphenyl)hexanol, alone or in mixtures. Preference is given to using 3,5-di-tert-butyl-4-hydroxybenzyl alcohol. The amount of the incorporable inhibitor, based on the weight of the sum of one mol of diisocyanate and one mol of a reactive olefinic compound having a reactive group (NCO/reactive group=2:1), is between 0.1%-3% by weight, preferably 0.1%-2% by weight, more preferably 0.1%-1% by weight.

The presence of further commercially customary polymerization inhibitors (antioxidants) is advantageous. Examples of suitable antioxidants include pyrocatechol, 4-methoxyphenol, 4-tert-butyloxyphenol, 4-benzyloxyphenol, α-naphthol, β-naphthol, phenothiazine, 10,10-dimethyl-9,10-dihydroacridine, bis[2-hydroxy-5-methyl-3-cyclohexylphenyl]methane, bis[2-hydroxy-5-methyl-3-tert-butylphenyl]methane, hydroquinone, pyrogallol, 3,4-dihydroxy-1-tert-butylbenzene, 4-methoxy-2(or 3)-tert-butylphenol (BHA), BHA also in combination with bis[2-carboxyethyl] sulfide (TDPA), 4-methyl-2,6-di-tert-butylphenol (BHT), bis[4-hydroxy-2-methyl-5-tert-butylphenyl] sulfide, 4-butylmercaptomethyl-2,6-di-tert-butylphenol, dioctadecyl 4-hydroxy-3,5-di-tert-butylphenylmethanesulfonate, 2,5-dihydroxy-1-tert-butylbenzene, 2,5-dihydroxy-1,4-di-tert-butylbenzene, 3,4-dihydroxy-1-tert-butylbenzene, and 2,3-dimethyl-1,4-bis[3,4-dihydroxyphenyl]butane, and also mixtures of these inhibitors. It is preferred to use phenothiazine and to use BHT.

The phenolic antioxidants may also be combined with phosphorous esters in accordance with the formula below, where X is oxygen or sulfur, and where $R^1$, $R^2$ and $R^3$ represent identical or different alkyl, alkylen-(1)-yl, aryl or aralkyl radicals having in each case 1-20 C atoms.

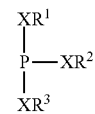

The phenolic antioxidants may also be combined with thioethers or amines, such as, for example, 2-anilinonaphthalene (PBN), 1-anilinonaphthalene (PAN) or 1,4-dianilinobenzene. It is of course also possible to use typical commercial substances which on the basis of their chemical structure combine two or more polymerization-inhibiting principles, such as 2,2'-thiobis(4-tert-octylphenol), for example. Preferred are phenothiazine, 2,6-di-tert-butyl-4-(4, 6-bis(octylthio)-1,3,5-triazin)-2-ylaminophenol, and 4-methyl-2,6-di-tert-butylphenol and 4,4'-methylenebis-2,6-di-tert-butylphenol.

The invention also provides for the use of the low-monomer-content 1:1 monoadducts of reactive olefinic compounds and diisocyanates in formulations as coating, sealant or adhesive compositions, for the coating, bonding or sealing of metal, plastics, glass, wood, MDF or leather substrates, or other substrates.

The present invention is elucidated but not restricted by examples below.

EXAMPLES

| Ingredients | Product description, manufacturer |
|---|---|
| IPDI | Isophorone diisocyanate, Evonik Degussa GmbH, Coatings & Additives |
| H12MDI | VESTANAT H12MDI, methylenedicyclohexyl diisocyanate (4,4'-$H_{12}$MDI), Evonik Degussa GmbH, Coatings & Additives |

-continued

| Ingredients | Product description, manufacturer |
|---|---|
| HEA | Hydroxyethyl acrylate, Aldrich |
| DBTL | Dibutyltin dilaurate, urethanization catalyst, Aldrich |
| TBP | 2,4,6-Tri-tert-butylphenol, nonincorporable inhibitor, Aldrich |
| IRGANOX 1010 | Pentaerythritol tetrakis(3-(3,5-di-tert-butyl-4-hydroxyphenyl)propionate), nonincorporable inhibitor, Ciba |
| IRGANOX 1726 | 4,6-Bis(dodecylthiomethyl)-o-cresol, nonincorporable inhibitor, Ciba |
| IRGANOX 1076 | Octadecyl 3-(3,5-di-tert-butyl-4-hydroxyphenyl)propionate, nonincorporable inhibitor, Ciba |
| IRGANOX 1098 | N,N'-Hexane-1,6-diylbis(3-(3,5-di-tert-butyl-4-hydroxyphenylpropionamide)), nonincorporable inhibitor, Ciba |
| IRGANOX 1520L | 4,6-Bis(octylthiomethyl)-o-cresol, nonincorporable inhibitor, Ciba |
| IRGANOX 1135 | 3,5-Bis(1,1-dimethylethyl)-4-hydroxy-benzenepropanoic acid, nonincorporable inhibitor, Ciba |
| IRGANOX 565 | 2,6-Di-tert-butyl-4-(4,6-bis(octyl-thio)-1,3,5-triazin-2-ylamino)phenol, nonincorporable inhibitor, Ciba |
| BHT | 4-Methyl-2,6-di-tert-butylphenyl, nonincorporable inhibitor, Ciba |
| Phenothiazine | Nonincorporable inhibitor, Aldrich |
| DBHBA | 2,6-di-tert-butyl-4-hydroxybenzyl alcohol, Aldrich, incorporable inhibitor |

1) General Reaction and Distillation Conditions IPDI

An intensively stirred mixture of 555 g (2.5 mol) of IPDI and 0.05 g of DBTL is admixed with 2.2 g (0.5% by weight) of the respective inhibitor (see table 1) and admixed dropwise with 116 g (1 mol) of hydroxyethyl acrylate, with dry air being passed over the solution. After the end of the addition, the solution is stirred at 80° C. until conversion of the hydroxyethyl acrylate alcohol component is complete (generally 2-4 h). During this reaction time as well, dry air is passed over. The batch is subsequently saturated with dry air and the unreacted diisocyanate is separated off by means of short-path distillation (KDL 4, UIC GmbH, Alzenau-Hörstein) at 200 g/h at 150° C. and 2 mbar, with a steady incoming stream of dry air being passed in countercurrent through the apparatus.

The chemical and physical data determined on the residue (reaction product) are indicated in table 1.

TABLE 1

| No. | Diisocyanate | Inhibitor 0.5% | $NCO_{found}$ [%] | Monomer content [%] |
|---|---|---|---|---|
| 1* | IPDI | — | | Gelled |
| 2* | IPDI | TBP | | Gelled |
| 3* | IPDI | IRGANOX 1010 | | Gelled |
| 4* | IPDI | IRGANOX 1726 | | Gelled |
| 5* | IPDI | IRGANOX 1076 | | Gelled |
| 6* | IPDI | IRGANOX 1098 | | Gelled |
| 7* | IPDI | IRGANOX 1520L | | Gelled |
| 8* | IPDI | IRGANOX 1135 | | Gelled |
| 9* | IPDI | IRGANOX 565 | | Gelled |
| 10* | IPDI | BHT | | Gelled |
| 11* | IPDI | Phenothiazine | | Gelled |
| 12 | IPDI | DBHBA | 10.9 | 0.3 |

*noninventive, comparative experiments

All experiments without incorporable inhibitor gelled (polymerized) during short-path distillation. These gelled products can no longer be fully dissolved, and hence also no NCO content was determined. Experiment 12 alone did not gel, and exhibits a monomeric IPDI content of 0.3%, a diadduct content of 0.8%, and a viscosity of 17 Pas (RT).

2) General Reaction and Distillation Conditions H12MDI, Inventive

An intensively stirred mixture of 655 g (2.5 mol) of H12MDI, 0.45 g of phenothiazine, and 0.05 g of DBTL is admixed with 2.2 g of DBHBA and admixed dropwise with 116 g (1 mol) of hydroxyethyl acrylate, with dry air being passed over the solution. After the end of the addition, the solution is stirred at 80° C. for 4 h, resulting in complete conversion of the alcohol component. During this reaction time as well, dry air is passed over. The batch is subsequently saturated with dry air and the unreacted diisocyanate is separated off by means of short-path distillation (KDL 4, UIC GmbH, Alzenau-Horstein) at 200 g/h at 200° C. and 2 mbar, with a steady incoming stream of dry air being passed in countercurrent through the apparatus.

The residue which remains is an ungelled, virtually colorless product having an NCO number of 9.5%, a monomer content of 0.9% by weight, and a viscosity of 31 Pas (RT).

3a) Example in Accordance with EP 1179555 with Reduced IPDI Excess without DBHBA, not Inventive An intensively stirred mixture of 2.5 mol of isophorone diisocyanate, 0.1% of phenothiazine, 0.1% of 2,6-di-tert-butyl-4-(4,6-bis(octylthio)-1,3,5-triazin-2-yl-aminophenol (IRGANOX 565), and 0.1% of 4,4'-methylene-bis-2,6-di-tert-butylphenol (BHT) is admixed dropwise at 75° C. with 1 mol of hydroxyethyl acrylate. After the end of the addition, stirring is continued at 90° C. until conversion of the alcohol component is complete. The batch is subsequently saturated with dry air and the unreacted diisocyanate is separated off by means of short-path distillation at 200 g/h and at 150° C. and 2 mbar, with a steady incoming stream of air being passed through the apparatus.

The residue exhibited distinct signs of gelling, and there were deposits in the short-path evaporator.

3b) Example in Accordance with EP 1179555 with Reduced IPDI Excess with DBHBA, Inventive An intensively stirred mixture of 2.5 mol of isophorone diisocyanate, 0.1% of phenothiazine, and 0.2% of DBHBA is admixed dropwise at 75° C. with 1 mol of hydroxyethyl acrylate. After the end of the addition, stirring is continued at 90° C. until conversion of the alcohol component is complete. The batch is subsequently saturated with dry air and the unreacted diisocyanate is separated off by means of short-path distillation at 200 g/h and at 150° C. and 2 mbar, with a steady incoming stream of air being passed through the apparatus.

The residue showed no signs of gelling at all, and the short-path evaporator did not show any deposits. The NCO number was 10.8%, the monomer content 0.4%, the diadduct content 0.5%, and the viscosity 16 Pas.

The invention claimed is:

1. A low-monomer-content 1:1 monoadduct, having a free diisocyanate content of less than 5% by weight, obtained by a process comprising reacting, as starting compounds,
A) at least one selected from the group consisting of an aliphatic diisocyanate, a cycloaliphatic diisocyanate, and an araliphatic diisocyanate, in an amount of 1-20 mol,
and
B) 1 mol of at least one reactive olefinic compound having an OH group, in an apparatus, to obtain a reaction product and unreacted diisocyanate,
wherein the unreacted diisocyanate is separated off by short-path distillation from the reaction product, wherein the short-path distillation takes place in the presence C) of at least one inhibitor comprising a hydroxyl, thiol, or amine group that is not directly bonded to an aromatic group and is reactive toward an NCO group, wherein an amount of the at least one inhibitor is between 0.1%-3% by weight, based on a weight of a sum of one mole of diisocyanate A) and one mole of a reactive olefinic compound B) corresponding to an NCO/OH of 2:1, wherein the at least one inhibitor is added before, during, or after the reacting of A) with B), and the at least one inhibitor is at least one selected from the group consisting of
1. present in free form,
2. attached to the component A), and
3. attached to the reaction product of A) with B), wherein the monoadduct comprises the at least one inhibitor, and wherein, during the short-path distillation or the entire process, at least one inhibitor gas is passed through the apparatus.

2. The monoadduct of claim 1, wherein 1-4.9 mol of diisocyanate A) are present in the reacting.

3. The monoadduct of claim 1, wherein the reacting of components A) and C) and subsequently B), or A) and B), takes place at temperatures of 40-120° C.

4. The monoadduct of claim 1, wherein the short-path distillation takes place at 80-220° C. and at a pressure of 0.1 to 10 mbar.

5. The monoadduct of claim 1, having a diadducts content of between 0.1% and 15% by weight in an end product.

6. The monoadduct of claim 1, wherein the inhibitor comprises a gas selected from the group consisting of air, nitrogen monoxide, oxygen, oxygen in a mixture, and a mixture of air, oxygen, or nitrogen monoxide and an additional fraction of 1%-90% by volume of carbon dioxide, nitrogen or a noble gas, or a mixture of these gases.

7. The monoadduct of claim 1, wherein the diisocyanate A) comprises at least one selected from the group consisting of 1,2-ethylene diisocyanate, 1,4-tetramethylene diisocyanate, 1,6-hexamethylene diisocyanate (HDI), 2,2,4-trimethyl-1,6-hexamethylene diisocyanate (TMDI), 2,4,4-trimethyl-1,6-hexamethylene diisocyanate (TMDI), 1,9-diisocyanato-5-methylnonane, 1,8-diisocyanato-2,4-dimethyloctane, 1,12-dodecane diisocyanate, $\omega,\omega'$-diisocyanatodipropyl ether, cyclobutene 1,3-diisocyanate, cyclohexane 1,3-diisocyanate, cyclohexane 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-(1,4-methanol-naphthalen-2,5-ylenedimethylene diisocyanate, decahydro-8-methyl-(1,4-methanol-naphthalen-3,5-ylenedimethylene diisocyanate, hexahydro-4,7-methanoindan-1,5-ylenedimethylene diisocyanate, hexahydro-4,7-methanoindan-2,5-ylenedimethylene diisocyanate, hexahydro-4,7-methanoindan-1,6-ylenedimethylene diisocyanate, hexahydro-4,7-methanoindan-2,5-ylenedimethylene diisocyanate, hexahydro-4,7-methanoindan-1,5-ylene diisocyanate, hexahydro-4,7-methanoindan-2,5-ylene diisocyanate, hexahydro-4,7-methanoindan-1,6-ylene diisocyanate, hexahydro-4,7-methanoindan-2,6-ylene diisocyanate, 2,4-hexahydrotolylene diisocyanate, 2,6-hexahydrotolylene diisocyanate, 4,4'-methylenedicyclohexyl diisocyanate (4,4'-$H_{12}$MDI), 2,2'-methylenedicyclohexyl diisocyanate (2,2'-$H_{12}$MDI), 2,4-methylenedicyclohexyl diisocyanate (2,4-$H_{12}$MDI) or else mixtures, 4,4'-diisocyanato-3,3',5,5'-tetramethyldicyclohexylmethane, 4,4'-diisocyanato-2,2',3,3, 5,5',6,6'-octamethyldicyclohexylmethane, $\omega,\omega'$-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, and 1,4-diisocyanatomethylcyclohexan.

8. The monoadduct of claim 1, wherein the olefinic compound B) comprises at least one selected from the group consisting of hydroxyethyl acrylate, hydroxypropyl acrylate, hydroxybutyl acrylate, hydroxyethyl methacrylate, hydroxypropyl methacrylate, hydroxylbutyl methacrylate, glycerol diacrylate, pentaerythritol triacrylate, trimethylolpropane diacrylate, glycerol dimethacrylate, pentaerythritol trimethacrylate, trimethylolpropane dimethacrylate, hydroxyethyl vinyl ether, hydroxypropyl vinyl ether, hydroxybutyl vinyl ether, hydroxypentyl vinyl ether, and hydroxyhexyl vinyl ether.

9. The monoadduct of claim 1, wherein C) is 3,5-di-tert-butyl-4-hydroxybenzyl alcohol, 3-(3,5-di-tert-butyl-4-hydroxyphenyl)propanol, 4-(3,5-di-tert-butyl-4-hydroxyphenyl)butanol, 5-(3,5-di-tert-butyl-4-hydroxyphenyl)pentanol, 6-(3,5-di-tert-butyl-4-hydroxyphenyl)hexanol, 3-tert-butyl-5-methyl-4-hydroxybenzyl alcohol, 3-(3,5-di-tert-butyl-4-hydroxyphenyl)propanol, 4-(3-tert-butyl-5 -methyl-4-hydroxyphenyl)butanol, 5-(3-tert-butyl-5-methyl-4-hydroxyphenyl)pentanol, 6-(3-tert-butyl-5-methyl-4-hydroxyphenyl)hexanol, 3,5-di-tert-butyl-4-hydroxybenzyl alcohol, 3-(3,5-di-tert-butyl-4-hydroxyphenyl)propanol, 4-(3,5-dimethyl-4-hydroxyphenyl)butanol, 5-(3,5-dimethyl-4-hydroxyphenyl)pentanol, and 6-(3,5-dimethyl-4-hydroxyphenyl)hexanol.

10. The monoadduct of claim 1, wherein at least one further polymerization inhibitor antioxidant is present.

11. The monoadduct of claim 1, having a free diisocyanate content of less than 1.0% by weight.

12. A process for preparing the low-monomer-content 1:1 monoadduct of claim 1, having a free diisocyanate content of less than 5% by weight, comprising:

reacting starting compounds comprising

A) at least one selected from the group consisting of an aliphatic diisocyanate, a cycloaliphatic diisocyanate, and an araliphatic diisocyanate, in an amount of 1-20 mol, and B) 1 mol of at least one reactive olefinic compound having at least one OH group, in an apparatus in a temperature range of 40-120° C., to obtain unreacted diisocyanate and a reaction product, wherein the unreacted diisocyanate is separated off subsequently by a short-path distillation at 80-220° C/0.1-10 mbar from the reaction product, and wherein the short-path distillation takes place in the presence of C) at least one inhibitor comprising a hydroxyl, thiol, or amine group that is not directly bonded to an aromatic group and is reactive toward NCO groups, wherein an amount of the at least one inhibitor is between 0.1%-3% by weight, based on a weight of a sum of one mole of diisocyanate A) and one mole of a reactive olefinic compound B) corresponding to an NCO/OH ratio of 2:1, and wherein the at least one inhibitor is added before, during, or after the reacting of A) with B), wherein the monoadduct comprises the at least one inhibitor, and wherein, during the short-path distillation or the entire process, at least one inhibitor gas is passed through the apparatus.

13. A coating composition, sealant composition, or adhesive composition, comprising the monoadduct of claim 1, wherein the composition is suitable for coating, bonding, sealing a metal substrate, a plastics substrate, a glass substrate, a wood substrate, an MDF substrate, a leather substrate, or a further substrate.

14. The monoadduct of claim 1, wherein 1.5-4 mol of diisocyanate A) are present in the reacting.

15. The monoadduct of claim 1, wherein the reacting of components A) and C) and subsequently B), or A) and B), takes place at temperatures of 40-80° C.

16. The monoadduct of claim 4, wherein the short-path distillation takes place at 130-200° C.

17. The monoadduct of claim 4, wherein the short-path distillation takes place at a pressure of 0.5 to 5 mbar.

18. The monoadduct of claim 1, wherein the short-path distillation takes place at 130-200° C. and at a pressure of 0.5 to 5 mbar.

19. The monoadduct of claim 1, wherein the short-path distillation takes in a thin-film evaporator or falling-film evaporator.

20. The monoadduct of claim 1, having a diadducts content of between 0.1% and 5% by weight in an end product.

\* \* \* \* \*